(12) United States Patent
Hanson

(10) Patent No.: US 8,485,022 B2
(45) Date of Patent: Jul. 16, 2013

(54) PACKAGE LEAK DETECTION

(75) Inventor: Craig Hanson, Concord, NC (US)

(73) Assignee: McKesson Corporation

( * ) Notice: Subject to any disclaimer, the term of this patent is extended or adjusted under 35 U.S.C. 154(b) by 552 days.

(21) Appl. No.: 12/640,638

(22) Filed: Dec. 17, 2009

(65) Prior Publication Data

US 2011/0146386 A1  Jun. 23, 2011

(51) Int. Cl.
*G01M 3/04* (2006.01)
*G01M 3/34* (2006.01)

(52) U.S. Cl.
USPC ............................................ 73/45.5; 73/49.3

(58) Field of Classification Search
USPC ........................................ 73/41.2, 45.5, 49.3
See application file for complete search history.

(56) References Cited

U.S. PATENT DOCUMENTS

| | | | | |
|---|---|---|---|---|
| 2,479,743 A | * | 8/1949 | Hall et al. | 73/45.5 |
| 3,172,058 A | * | 3/1965 | Freeborn | 331/113 A |
| 2009/0178469 A1 | * | 7/2009 | Tseng | 73/45.5 |

* cited by examiner

*Primary Examiner* — Hezron E Williams
*Assistant Examiner* — Nathaniel Kolb
(74) *Attorney, Agent, or Firm* — Alston & Bird LLP

(57) ABSTRACT

Systems, methods, and apparatus are provided for detecting improperly sealed portions of sealed packages. For example, in one embodiment, a package leak detection system automatically provides pressure within a tank for a predetermined period of time. The tank is at least partially filled with colored fluid with a sealed package being at least partially submerged in the colored fluid. In the tank, the pressure inside the tank forces the colored fluid into improperly sealed portions of the sealed package. After the predetermined period of time has elapsed, the package leak detection system automatically shuts off the package leak detection system and releases the pressure within the tank so the sealed package can be inspected for potential leaks.

19 Claims, 4 Drawing Sheets

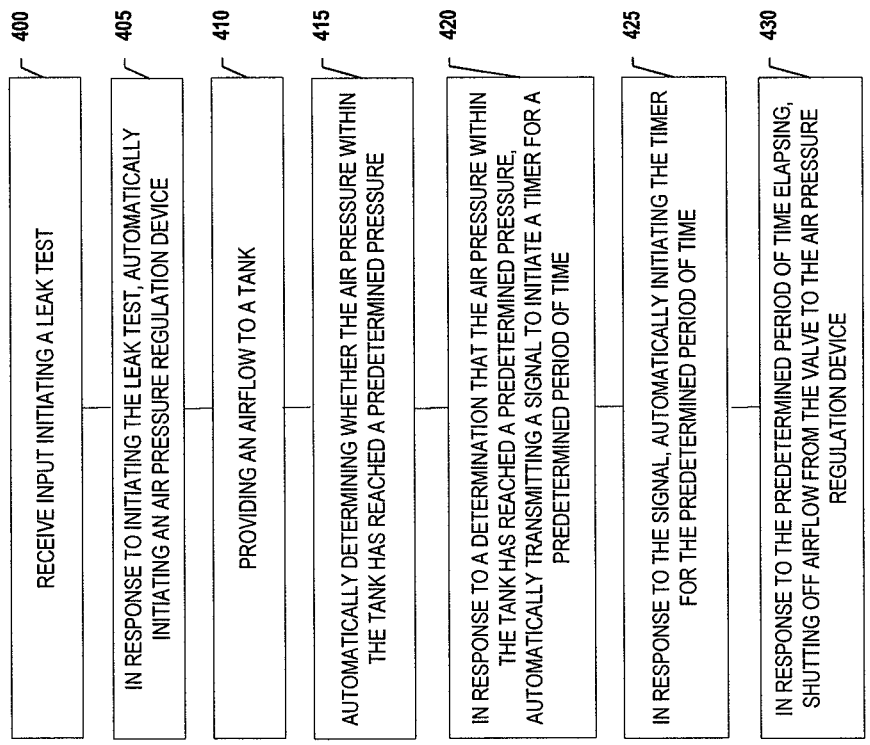

PACKAGE LEAK DETECTION

BACKGROUND

Sealed packages containing items have become very common place in today's world. For example, sealed packages are used to store, deliver, and transfer items such as food, medicine, chemicals, products, and the like. And given the abundant use of sealed packages, it is increasingly important to ensure that the sealed packages are properly sealed to prevent, for example, spoilage, tampering, or contamination of the items contained in the sealed packages. Thus, a need exists for more efficient and effective detection of improperly sealed portions of sealed packages.

SUMMARY

Systems, methods, and apparatus are provided for detecting improperly sealed portions of sealed packages. According to one aspect, a system for identifying leaks in a sealed package is provided. In one embodiment, the system comprises (a) an air pressure regulation device adapted for providing an airflow at a predetermined pressure and (b) an air valve for controlling airflow into the air pressure regulation device. The system also comprises (c) a desiccator tank in fluid communication with the air pressure regulation device, wherein the desiccator tank is adapted for receiving airflow from the air pressure regulation device; (d) a timer initiation device in fluid communication with the air pressure regulation device and the desiccator tank; and (e) a timer adapted for automatically shutting off airflow from the air valve to the air pressure regulation device in response to a predetermined period of time elapsing. In particular, the timer initiation device is adapted for (i) determining whether the air pressure within the desiccator tank has reached the predetermined pressure, and (ii) in response to the air pressure within the desiccator tank reaching the predetermined pressure, automatically transmitting a signal to initiate the timer for the predetermined period of time. Similarly, the timer is adapted for (i) receiving the signal initiating the timer for the predetermined period of time, (ii) in response to receiving the signal, automatically initiating the timer for the predetermined period of time, and (iii) in response to the predetermined period of time elapsing, shutting off airflow from the air valve to the air pressure regulation device. In these embodiments, the predetermined pressure within the desiccator tank forces colored fluid into improperly sealed portions of the sealed packages to identify potential leaks.

In another aspect, another system for identifying leaks in a sealed package is provided. In one embodiment, the system comprises (a) an air pressure regulation device adapted for providing an airflow at a predetermined pressure and (b) an air valve for controlling airflow into the air pressure regulation device. The system also comprises (c) a tank in fluid communication with the air pressure regulation device, wherein the tank is adapted for receiving airflow from the air pressure regulation device; (d) a timer initiation device in fluid communication with the air pressure regulation device and the tank; and (e) a timer adapted for automatically shutting off airflow from the air valve to the air pressure regulation device in response to a predetermined period of time elapsing. In particular, the timer initiation device is adapted for (i) determining whether the air pressure within the tank has reached the predetermined pressure, and (ii) in response to the air pressure within the tank reaching the predetermined pressure, automatically transmitting a signal to initiate the timer for the predetermined period of time. Similarly, the timer is adapted for (i) receiving the signal initiating the timer for the predetermined period of time, (ii) in response to receiving the signal, automatically initiating the timer for the predetermined period of time, and (iii) in response to the predetermined period of time elapsing, shutting off airflow from the air valve to the air pressure regulation device.

In yet another aspect, a method for identifying leaks in a sealed package is provided. In one embodiment, the method comprises (a) receiving input initiating a leak test; (b) in response to receiving input initiating the leak test, automatically initiating an air pressure regulation device adapted for providing an airflow at a predetermined pressure to a tank; (c) providing an airflow to the tank; and (d) automatically determining whether the air pressure within the tank has reached the predetermined pressure. The method also comprises (e) in response to a determination that the air pressure within the tank has reached the predetermined pressure, automatically transmitting a signal from the timer initiation device to a timer to initiate the timer for a predetermined period of time; (f) receiving the signal initiating the timer for the predetermined of time; (g) in response to receiving the signal, automatically initiating the timer for the predetermined period of time; and (h) in response to the predetermined period of time elapsing, shutting off airflow from the air valve to the air pressure regulation device.

And in still another aspect, another method for identifying leaks in a sealed package is provided. In one embodiment, the method comprises (a) receiving input initiating a leak test; (b) in response to receiving input initiating the leak test, automatically initiating an air pressure regulation device adapted for providing an airflow at a predetermined pressure to a desiccator tank that is at least partially filled with a colored fluid; and (c) providing an airflow to the desiccator tank. The method also comprises (d) automatically determining whether the air pressure within the desiccator tank has reached the predetermined pressure; (e) in response to a determination that the air pressure within the desiccator tank has reached the predetermined pressure, automatically transmitting a signal from the timer initiation device to a timer to initiate the timer for a predetermined period of time; (f) receiving the signal initiating the timer for the predetermined of time; (g) in response to receiving the signal automatically initiating the timer for the predetermined period of time; and (h) in response to the predetermined period of time elapsing, shutting off airflow from the air to the air pressure regulation device.

BRIEF DESCRIPTION OF THE SEVERAL VIEWS OF THE DRAWINGS

Reference will now be made to the accompanying drawings, which are not necessarily drawn to scale, and wherein:

FIG. 4 is a flowchart for operation and use of the package leak detection system according to one embodiment of the present invention.

DETAILED DESCRIPTION

Embodiments of the present inventions now will be described more fully hereinafter with reference to the accompanying drawings, in which some, but not all embodiments of the inventions are shown. Indeed, the inventions may be embodied in many different forms and should not be construed as limited to the embodiments set forth herein; rather, these embodiments are provided so that this disclosure will satisfy applicable legal requirements. Like numbers refer to like elements throughout.

Brief Overview of Package Leak Detection System

Systems, methods, and apparatus are provided for detecting improperly sealed portions of sealed packages. For example, in one embodiment, a package leak detection system automatically provides pressure within a tank for a predetermined period of time. In one embodiment, the tank is at least partially filled with colored fluid with a sealed package being at least partially submerged in the colored fluid. In the tank, the pressure inside the tank forces colored fluid into improperly sealed portions of the sealed package. After the predetermined period of time has elapsed, the package leak detection system automatically shuts off the package leak detection system and releases the pressure within the tank so the sealed package can be inspected for potential leaks.

Exemplary Components of Package Leak Detection System

Figure 1:
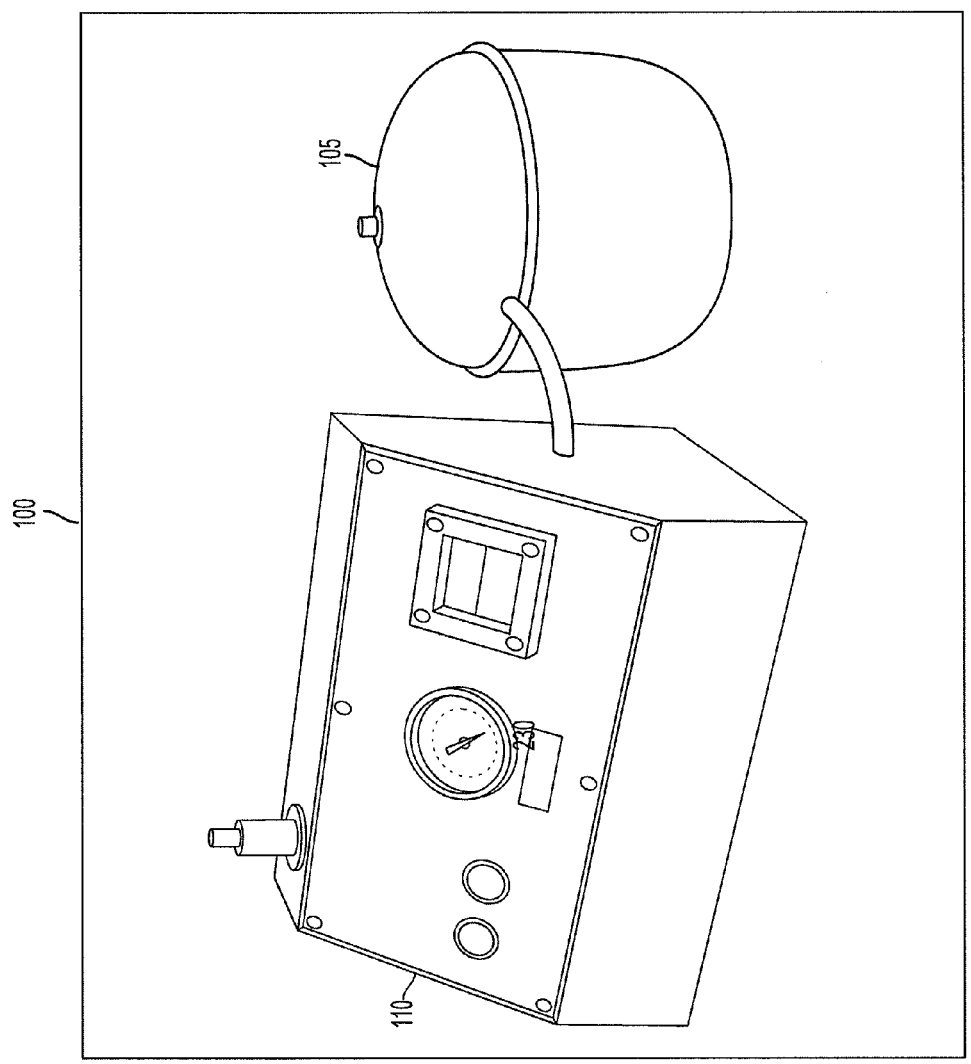
FIG. 1 is an exemplary package leak detection system according to one embodiment of the present invention.

FIG. 1 shows a package leak detection system 100 (including a tank 105 and a pump housing 110) for detecting improperly sealed portions of sealed packages according to one embodiment of the present invention. The term "sealed package" generally refers to any sealed package. For example, a sealed package may be a unit dose blister storing a unit dose of medication that has been sealed in a package, such as a vinyl and foil package in which the vinyl conforms to the shape of the medication. Similarly, the sealed package may be a plastic bag storing food or chemicals with the edges of the bag sealed (or any of a variety of other sealed packages).

Figure 2:
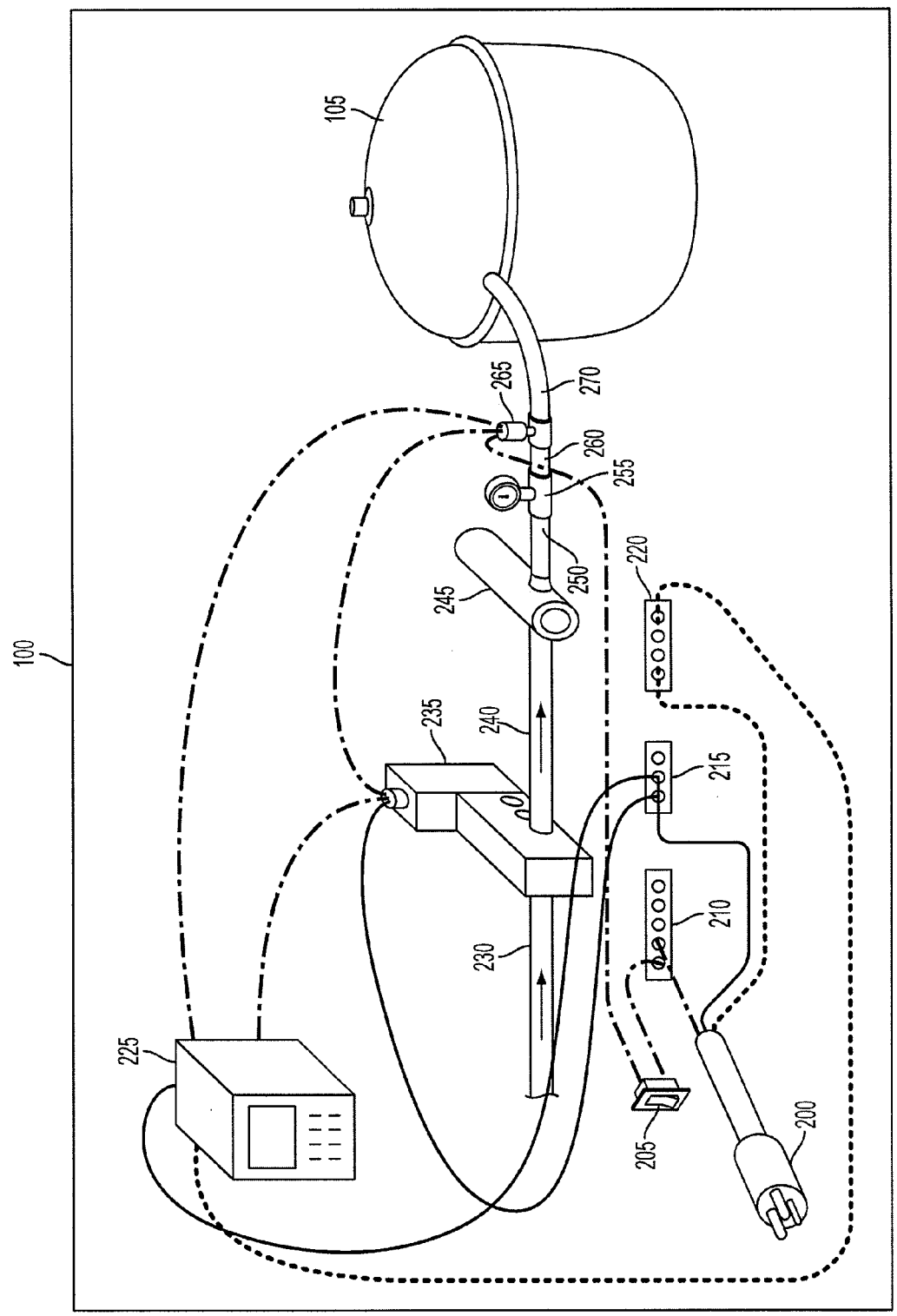
FIG. 2 is a schematic of exemplary components of a package leak detection system according to one embodiment of the present invention.

FIG. 2 is a schematic of exemplary components of a package leak detection system 100 according to one embodiment of the present invention. As may be understood from FIG. 2, in one embodiment, the package leak detection system 100 comprises: (1) a power plug 200; (2) a power switch 205; (3) a power connector 210; (4) a neutral connector 215; (5) a ground connector 220; (6) a timer 225; (7) an air input tubing 230; (8) an air valve 235; (9) a first section of connector tubing 240; (10) an air pressure regulation device 245; (11) a second section of connector tubing 250; (12) a pressure gauge 255; (13) a third section of connector tubing 260; (14) a timer initiation device 265; (15) an air output tubing 270; and (16) a tank 105. Many of the components identified as components (1)-(15) may be attached to or stored within the pump housing 110.

The following sections describe the components of a package leak detection system 100.

Tank

In one embodiment, the package leak detection system 100 includes a tank 105 adapted for detecting improperly sealed portions of sealed packages. In one embodiment, the tank 105 is a desiccator container, such as the Scienceware vacuum desiccator F42025-000. Thus, in one embodiment, the tank 105 (e.g., desiccator container) is a pressure sealable enclosure. As will be recognized, in alternative embodiments, the tank 105 may be any pressure sealable enclosure. To detect leaks, the tank 105 is at least partially filled with a colored fluid such that when a sealed package is placed in the tank and at least partially submerged in the colored fluid under a certain pressure, the pressure forces colored fluid into improperly sealed portions of the sealed packages. For example, in one embodiment, a sealed package submerged within colored fluid in the tank 105 under a certain pressure will allow colored fluid to enter into improperly sealed portions of a sealed package.

To provide pressure within the tank and automatically perform the leak test, the package leak detection system 100 may include many of the components shown in FIG. 2. The components shown in FIG. 2 are discussed below.

Power

As shown in FIG. 2, in one embodiment, the package leak detection system 100 comprises a power plug 200 that can be connected to, for example, a 120 volt alternating current ("AC") power source. In one embodiment, the current from the power source can be provided to the package leak detection system 100 via a power switch 205, such as a toggle switch, a rocker switch, or an on-off switch. The power switch 205 includes a power wire, a neutral wire, and a ground wire connected respectively to the power connector 210, neutral connector 215, and ground connector 220 to provide a circuit for and power to the package leak detection system 100.

In one embodiment, a user can operate the power switch 205 to initialize the package leak detection system 100 and initiate a leak test. For example, by positioning the power switch 205 to the ON position, power is provided to the package leak detection system 100 and a package leak test is initiated. In one embodiment, the package leak detection system 100 is adapted for automatically initiating a leak test each time the power switch is positioned to the ON position.

Air Flow

As shown in FIG. 2, in one embodiment, the package leak detection system 100 includes an air valve 235, an air pressure regulation device 245, a pressure gauge 255, and a timer initiation device 265. In one embodiment, the air valve 235 is an on-off valve that is adapted for providing and shutting off airflow to the air pressure regulation device 245. To do so, the air valve 235 is (a) in fluid communication with air input tubing 230 that provides airflow into the air valve 235 and (b) in fluid communication with a first section of connector tubing 240 that provides airflow into the air pressure regulation device 245 from the air valve 235. The diameter of the air input tubing 230 and first section of connector tubing 240 may vary, but, in one embodiment, the diameter is about ⅜ inch to ½ inch. Additionally, the air input tubing 230 may include an air filter (not shown) to provide filtered air to the air valve 235.

In one embodiment, the air pressure regulation device 245 is in fluid communication with the air valve 235 via the first section of connector tubing 240 and is adapted for providing airflow at a predetermined pressure (e.g., 15 inches of Hg) into, for example, the tank 105. That is, the air pressure regulation device 245 is adapted for creating a substantially constant air pressure within the tank 105. In one embodiment, to do so, the air pressure regulation device 245 is a venturi vacuum pump that can provide a variety of flow rates and vacuum levels. In various embodiments, venturi vacuum pumps are suited for operating in manufacturing environments and for maximizing energy efficiency by consuming only the air necessary to generate the desired pressure, such as the Vaccon variable, dirt tolerant venturi vacuum pump VDF-250-ST4A2. As will be recognized, the air pressure regulation device 245 may alternatively be, for example, a compressor, a centrifugal vacuum pump, and/or the like.

In one embodiment, the air pressure regulation device 245 is also in fluid communication with the tank 105 to provide an airflow at a predetermined pressure (e.g., between 10-20 inches of Hg) to the tank 105. In one embodiment, the air pressure regulation device 245 is in fluid communication with the tank 105 via one or more sections of tubing 250, 260, 270 and may have one or more components positioned there between. For example, in one embodiment, a pressure gauge 255 (e.g., an air pressure gauge) and a timer initiation device 265 are in fluid communication with the air pressure regulation device 245 and the tank 105 by being connected via the tubing sections 250, 260, 270. As shown in FIG. 2, the air pressure regulation device 245 is in fluid communication with the pressure gauge 255 via a second section of connector tubing 250. Similarly, the air pressure regulation device 245 is in fluid communication with (a) the timer initiation device 265 via a third section of connector tubing 260 and (b) the tank 105 via an air output tubing 270. In one embodiment, each section of tubing has the same diameter of about ⅜ inch to ½ inch, which may be increased or decreased as desired. In other embodiments, the diameter of each section of tubing may vary.

In one embodiment, the pressure gauge 255 is adapted for measuring the pressure within (a) the second and third sections of connector tubing 250, 260, (b) the air output tubing 270, and/or (c) the tank 105. By measure the pressure, the pressure gauge 255 allows a user to monitor whether the air pressure regulation device 245 is properly providing the airflow at the predetermined pressure.

In one embodiment, the timer initiation device 265 is adapted for (a) determining whether the air pressure within the desiccator tank has reached the predetermined pressure, and (b) in response to the air pressure within the desiccator tank reaching the predetermined pressure, automatically transmitting a signal to initiate a timer 225 for the predetermined period of time. In one embodiment, to do so, the timer initiation device 265 is a vacuum switch, such as a Barksdale vacuum switch series 96221. In this embodiment, when the pressure within the second section of connector tubing 250, the third section of connector tubing 260, the air output tubing 270, or the tank 105 reaches the predetermined pressure (e.g., 15 inches of Hg), the timer initiation device 265 is sends a signal (e.g., an electrical burst) to the timer 225 to start the timer 225 for the predetermined period of time (e.g., one minute). As will be recognized, in alternative embodiments, the timer initiation device 265 may also be a pressure switch or other device performing a similar function.

Timer

As shown in FIG. 2, in one embodiment, the package leak detection system 100 includes a timer 225. The timer is adapted for shutting off the air valve after a predetermined period of time has elapsed (e.g., one minute). In one embodiment, to do so, the timer is a solid state timer, such as the OMRON solid state timer H3CA. In one embodiment, the timer is adapted for (a) receiving a signal (e.g., an electrical burst) initiating the timer for the predetermined period of time from the timer initiation device 265 (e.g., when the timer initiation device 265 determines that the pressure within the tank 105 has reached the predetermined pressure). In response to receiving the signal from the timer initiation device 265, the timer is also adapted for (a) automatically initiating the timer for the predetermined period of time, and (b) in response to the predetermined period of time elapsing, shutting off airflow from the air valve 235 to the air pressure regulation device 245 (e.g., by transmitting a signal to close or shut off the air valve 235). In one embodiment, to do so, the timer 225 operates as an interval timer in which the signal (e.g., an input voltage) turns load ON for a predetermined period of time (e.g., one minute). As shown below in Table 1, at the end of the predetermined period of time (e.g., when the predetermined period of time elapses), the timer 225 turns load OFF, which automatically closes or shuts off the air valve 235.

TABLE 1

| INPUT VOLTAGE | ON | |
|---|---|---|
| | OFF | RESET |
| LOAD | ON | |
| | OFF | INTERVAL |

Figure 3:
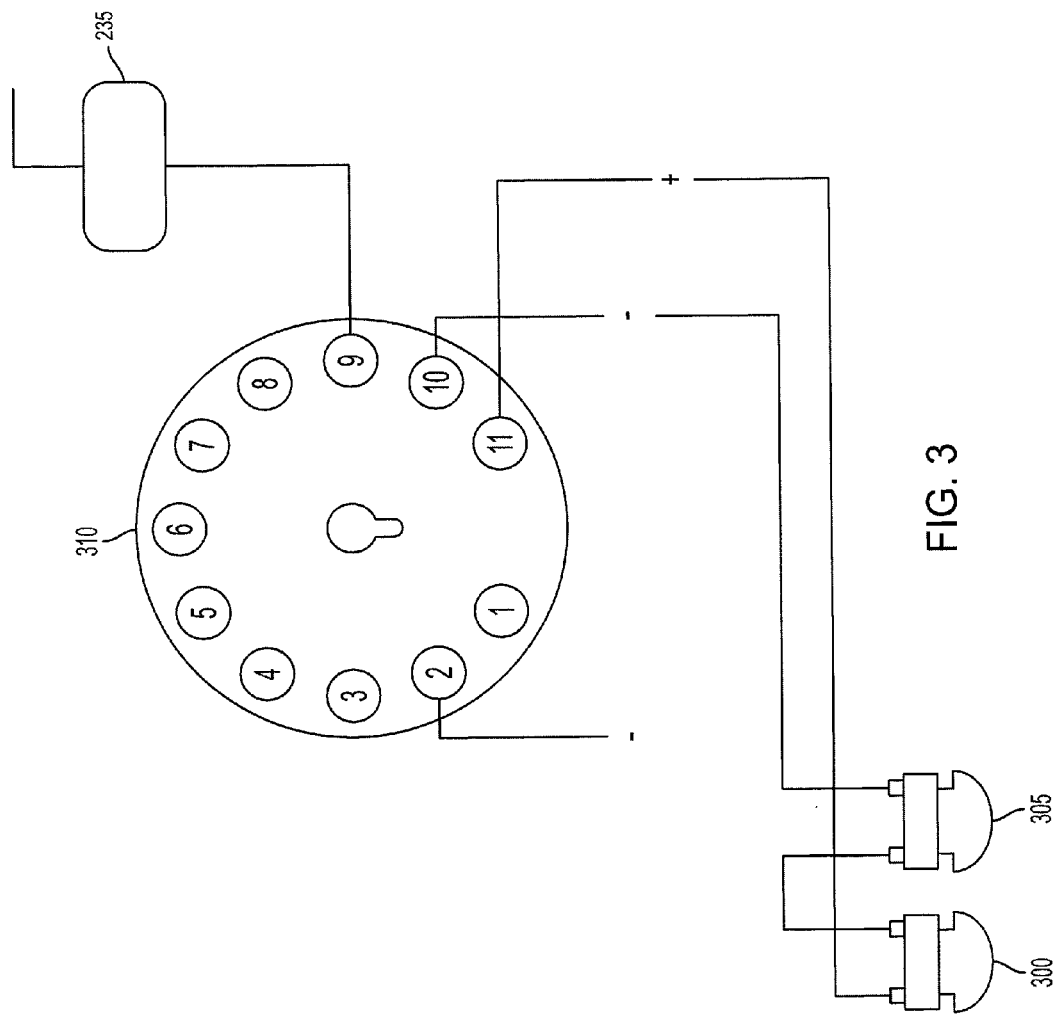
FIG. 3 is a schematic of a portion of an exemplary timer of a package leak detection system according to one embodiment of the present invention.

In various embodiments, the timer may also include a restart switch 300 and a stop switch 305, such as those shown in FIG. 3 for various reasons. For example, if the lid on the tank 105 is not properly secured, the pressure within the tank may not reach the desired pressure. However, in such cases, the package leak detection system 100 may continue to run because the proper pressure would not be reached. Moreover, the pressure within the tank may still be sufficient such that it would be difficult to remove the lid off of the tank 105, which may require unplugging the package leak detection system 100 to reset it. Thus, in one embodiment, the stop switch 305 can be operated by a user to, for example, stop the leak test (e.g., close or shut off the air valve 235) so the user can secure the lid to the tank 105. Similarly, once the lid has been secured, the user can operate the restart switch 300 to restart the leak test (e.g., open the air valve 235). Thus, a user can depress (a) the stop switch 305 to shut off the air valve 235 and release the pressure within the tank and (b) depress the restart switch 300 to restart the leak test and open the air valve 235.

Exemplary Operation and Use of Package Leak Detection System

In operation, according to one embodiment, the package leak detection system 100 is used to identify potential leaks in sealed packages. In one embodiment, the package leak detection system 100 receives input initiating a leak test (Block 400). For example, the input may be received via a user depressing the power switch 205. In Block 405, once the package leak detection system 100 receives input initiating a leak test, the package leak detection system 100 automatically initiates the air pressure regulation device 245. For example, when the power is provided to the package leak detection system 100, the package leak detection system 100 transmits a signal to the air valve 235 that opens the air valve 235 and provides airflow to the air pressure regulation device 245. Once the air pressure regulation device 245 receives airflow from the air valve 235, the air pressure regulation device 245 provides an airflow at the predetermined pressure to the tank 105 (that is at least partially filled with a colored fluid) via, for example, the sections of tubing 250, 260, 270 (Block 410).

In one embodiment, during operation of the air pressure regulation device 245, the pressure gauge 255 and the timer initiation device 265 continuously monitor the pressure within the tank 105 to automatically determine whether the air pressure within the tank 105 has reached the predetermined pressure, e.g., 15 inches of Hg (Block 415). When the timer initiation device 265 determines that the pressure within the tank 105 has reached the predetermined pressure, the timer initiation device 265 automatically transmits a signal to the timer 225 to start timing for the predetermined period of time, e.g., one minute (Block 420). Once the timer 225 receives the signal initiating the timer for the predetermined period of time, the timer 225 automatically times the predetermined period of time (Block 425). During the predetermined period of time in which the pressure within the tank 105 is substantially near the predetermined pressure, the pressure within the tank 105 forces colored fluid into improperly sealed portions of sealed packages to identify potential leaks (Block 405).

After the predetermined period of time elapses, the timer 225 automatically shuts off the airflow from the air valve 235 to the air pressure regulation device 245 (Block 430), which shuts down the air pressure regulation device 245 and allows the pressure within the tank 105 to return to normal. The user can then open the lid to the tank 105 and inspect the sealed package to determine if any interior portion of the sealed package contains colored fluid. In the event an interior portion of the sealed package contains colored fluid, the user knows that at least a portion of the sealed package was improperly sealed.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for identifying leaks in a sealed package comprising:
    an air pressure regulation device adapted for providing an airflow at a predetermined pressure;
    an air valve for controlling airflow into the air pressure regulation device;
    a tank in fluid communication with the air pressure regulation device, wherein the tank is adapted for receiving airflow from the air pressure regulation device;
    a timer initiation device in fluid communication with the air pressure regulation device and the tank; and
    a timer adapted for automatically shutting off airflow from the air valve to the air pressure regulation device in response to a predetermined period of time elapsing, wherein
        the timer initiation device is adapted for (a) determining whether the air pressure within the tank has reached the predetermined pressure, and (b) in response to the air pressure within the tank reaching the predetermined pressure, automatically transmitting a signal to initiate the timer for the predetermined period of time,
        the timer is adapted for (a) receiving the signal initiating the timer for the predetermined period of time, (b) in response to receiving the signal, automatically initiating the timer for the predetermined period of time, and (c) in response to the predetermined period of time elapsing, shutting off airflow from the air valve to the air pressure regulation device, and
        the predetermined pressure within the tank forces colored fluid into improperly sealed portions of the sealed package to identify potential leaks.

2. The system of claim 1, wherein the air pressure regulation device is a venturi vacuum pump.

3. The system of claim 1, wherein the timer initiation device is a vacuum switch.

4. A system for identifying leaks in a sealed package comprising:
    an air pressure regulation device adapted for providing an airflow at a predetermined pressure;
    an air valve for controlling airflow into the air pressure regulation device;
    a tank in fluid communication with the air pressure regulation device, wherein the tank is adapted for receiving airflow from the air pressure regulation device;
    a timer initiation device in fluid communication with the air pressure regulation device and the tank; and
    a timer adapted for automatically shutting off airflow from the air valve to the air pressure regulation device in response to a predetermined period of time elapsing, wherein
        the timer initiation device is adapted for (a) determining whether the air pressure within the tank has reached the predetermined pressure, and (b) in response to the air pressure within the tank reaching the predetermined pressure, automatically transmitting a signal to initiate the timer for the predetermined period of time, and
        the timer is adapted for (a) receiving the signal initiating the timer for the predetermined period of time, (b) in response to receiving the signal, automatically initiating the timer for the predetermined period of time, and (c) in response to the predetermined period of time elapsing, shutting off airflow from the air valve to the air pressure regulation device.

5. The system of claim 4, wherein the tank is a desiccator tank.

6. The system of claim 4, wherein the tank is at least partially filled with a colored fluid.

7. The system of claim 6, wherein the predetermined pressure within the tank forces colored fluid into improperly sealed portions of the sealed package to identify potential leaks.

8. The system of claim 4, wherein the air pressure regulation device is a venturi vacuum pump.

9. The system of claim 4, wherein the timer initiation device is a vacuum switch.

10. The system of claim 4, wherein the timer is a solid state timer.

11. A method for identifying leaks in a sealed package comprising:
    receiving, via a power switch, input initiating a leak test;
    in response to receiving input initiating the leak test, automatically initiating an air pressure regulation device adapted for providing an airflow at a predetermined pressure to a tank;
    providing an airflow, via the air pressure regulation device, to the tank;
    automatically determining, via a timer initiation device, whether the air pressure within the tank has reached the predetermined pressure;
    in response to a determination that the air pressure within the tank has reached the predetermined pressure, automatically transmitting a signal from the timer initiation device to a timer to initiate the timer for a predetermined period of time;
    receiving, at the timer, the signal initiating the timer for the predetermined period of time;
    in response to receiving the signal, via the timer, automatically initiating the timer for the predetermined period of time; and
    in response to the predetermined period of time elapsing, automatically shutting off airflow from the air valve to the air pressure regulation device.

12. The method of claim 11, wherein the tank is a desiccator tank.

13. The method of claim 11, wherein the tank is at least partially filled with a colored fluid.

14. The method of claim 11, wherein the predetermined pressure within the tank forces colored fluid into improperly sealed portions of the sealed package to identify potential leaks.

15. The method of claim 11, wherein the air pressure regulation device is a venturi vacuum pump.

16. The method of claim 11, wherein the timer initiation device is a vacuum switch.

17. A method for identifying leaks in a sealed package comprising:
   receiving, via a power switch, input initiating a leak test;
   in response to receiving input initiating the leak test, automatically initiating an air pressure regulation device adapted for providing an airflow at a predetermined pressure to a tank that is at least partially filled with a colored fluid, wherein the predetermined pressure within the tank forces colored fluid into improperly sealed portions of sealed package to identify potential leaks;
   providing an airflow, via the air pressure regulation device, to the tank;
   automatically determining, via a timer initiation device, whether the air pressure within the tank has reached the predetermined pressure;
   in response to a determination that the air pressure within the tank has reached the predetermined pressure, automatically transmitting a signal from the timer initiation device to a timer to initiate the timer for a predetermined period of time;
   receiving, at the timer, the signal initiating the timer for the predetermined period of time;
   in response to receiving the signal, via the timer, automatically initiating the timer for the predetermined period of time; and
   in response to the predetermined period of time elapsing, automatically shutting off airflow from the air valve to the air pressure regulation device.

18. The method of claim 17, wherein the air pressure regulation device is a venturi vacuum pump.

19. The method of claim 17, wherein the timer initiation device is a vacuum switch.

* * * * *